United States Patent [19]
Chen

[11] Patent Number: 5,513,048
[45] Date of Patent: Apr. 30, 1996

[54] TELESCOPIC SIDE VIEW MIRROR FOR AUTOMOBILES

[76] Inventor: Ming-En Chen, P.O. Box 82-144, Taipei, Taiwan

[21] Appl. No.: 429,557

[22] Filed: Apr. 27, 1995

[51] Int. Cl.⁶ .............. A45D 40/00; B60R 1/02; G02B 7/18; G09F 15/00
[52] U.S. Cl. .......... 359/881; 359/872; 359/871; 248/223.41; 248/231.41; 248/298.1; 248/480
[58] Field of Search .................. 248/473, 429, 248/223.21, 231.41, 244, 480, 298.1; 359/841, 844, 871, 872, 881

[56] References Cited

U.S. PATENT DOCUMENTS

| | | | |
|---|---|---|---|
| 3,806,189 | 4/1974 | Simjian | 359/881 |
| 4,119,107 | 10/1978 | Pinzone et al. | 359/881 |
| 4,319,731 | 3/1982 | Pfeifer | 248/223.41 |
| 4,407,418 | 10/1983 | Brammer | 248/298.1 |
| 4,451,021 | 5/1984 | Merris | 248/480 |
| 4,538,784 | 9/1985 | O'Flanagan | 248/244 |
| 4,711,538 | 12/1987 | Ohs et al. | 248/298.1 |
| 4,730,913 | 3/1988 | Boothe | 248/298.1 |
| 5,124,857 | 6/1992 | Pitz | 359/872 |
| 5,342,015 | 8/1994 | Burton et al. | 359/871 |
| 5,356,104 | 10/1994 | Rosenberg et al. | 248/223.41 |
| 5,359,461 | 10/1994 | Rice et al. | 359/872 |
| 5,419,134 | 5/1995 | Gibson | 248/223.41 |

FOREIGN PATENT DOCUMENTS

| | | | |
|---|---|---|---|
| 1284657 | 12/1968 | France | 248/298 |
| 0719553 | 1/1954 | United Kingdom | 359/881 |

*Primary Examiner*—Paul M. Dzierzynski
*Assistant Examiner*—Mohammad Y. Sikder
*Attorney, Agent, or Firm*—Alfred Lei

[57] ABSTRACT

A telescopic side view mirror for automobiles including a housing, a fixing tubular member formed with an inner tubular member having a longitudinal groove at a bottom, a stopper being fixedly mounted in the longitudinal groove of the inner tubular member, an outer tubular member extending into the housing and fixedly mounted therein, a tubular connector fitted in the housing and formed with a slot having a first threaded hole engaged with a first bolt, a second threaded hole aligned with the hole of the outer tubular member, and two protuberances one close to an end thereof, and a positioning member fitted between the slot of the tubular connector and the longitudinal groove of the inner tubular member, whereby the mirror can be easily adjusted in position.

5 Claims, 5 Drawing Sheets

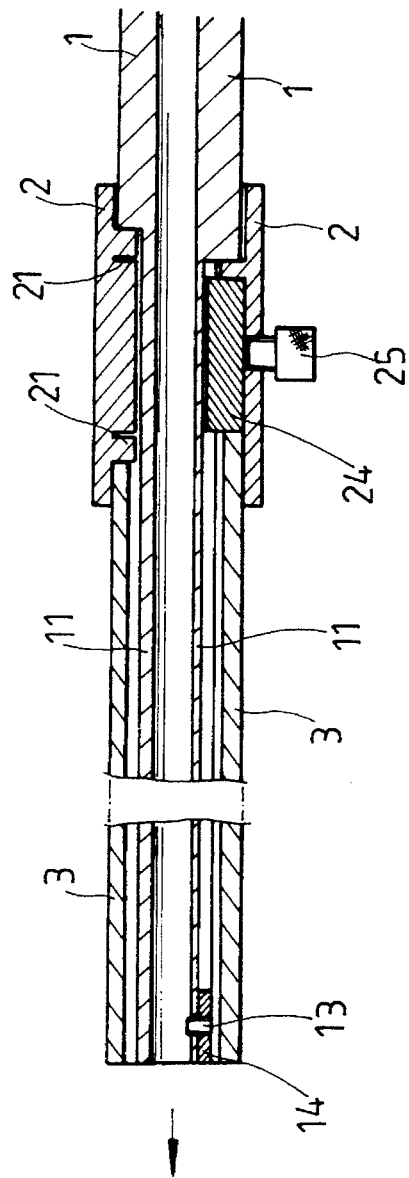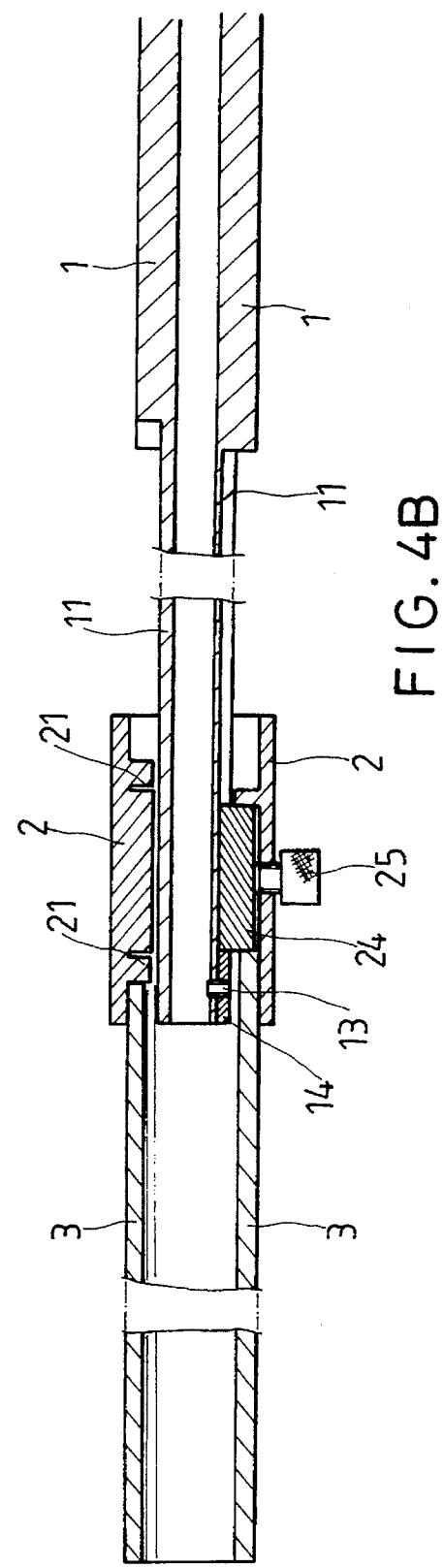

TELESCOPIC SIDE VIEW MIRROR FOR AUTOMOBILES

BACKGROUND OF THE INVENTION

1. Field of the Invention

This invention is related to an improvement in the telescopic structure of a side view mirror for automobiles.

2. Description of the Prior Art

It has been found that the prior art telescopic side view mirror for automobiles includes a housing 80, an inner tubular member 81, an outer tubular member 82, a bolt 83, a mount 84, and a plurality of screws 85. The inner tubular member 81 is inserted into the housing 82 and secured therein by a mount 84 in association with a plurality of screws 85. The inner tubular member 81 is inserted into the outer tubular member 82 and kept in place by the bolt 83.

However, such a telescopic side view mirror for automobiles is difficult to adjust and easily gets out of the inner tubular member 81 thereby causing much inconvenience in use.

Therefore, it is an object of the present invention to provide a telescopic side view mirror for automobiles which can obviate and mitigate the above-mentioned drawbacks.

SUMMARY OF THE INVENTION

This invention relates to a telescopic side view mirror for automobiles.

It is the primary object of the present invention to provide a telescopic side view mirror for automobiles which can be easily adjusted in longitudinal position.

It is another object of the present invention to provide a telescopic side view mirror for automobiles which is facile in operation.

It is still another object of the present invention to provide a telescopic side view mirror for automobiles which is simple in construction.

It is still another object of the present invention to provide a telescopic side view mirror for automobiles which can enhance safety for the driver.

It is a further object of the present invention to provide a telescopic side view mirror for automobiles which is practical is use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 1A is a sectional view taken along line 1A—1A of FIG. 1;

FIG. 2A is a sectional view taken along line 2A—2A of FIG. 2;

FIGS. 4A and 4B show the working principle of the present invention; and

DETAILED DESCRIPTION OF THE PREFERRED EMBODIMENT

Figure 1:
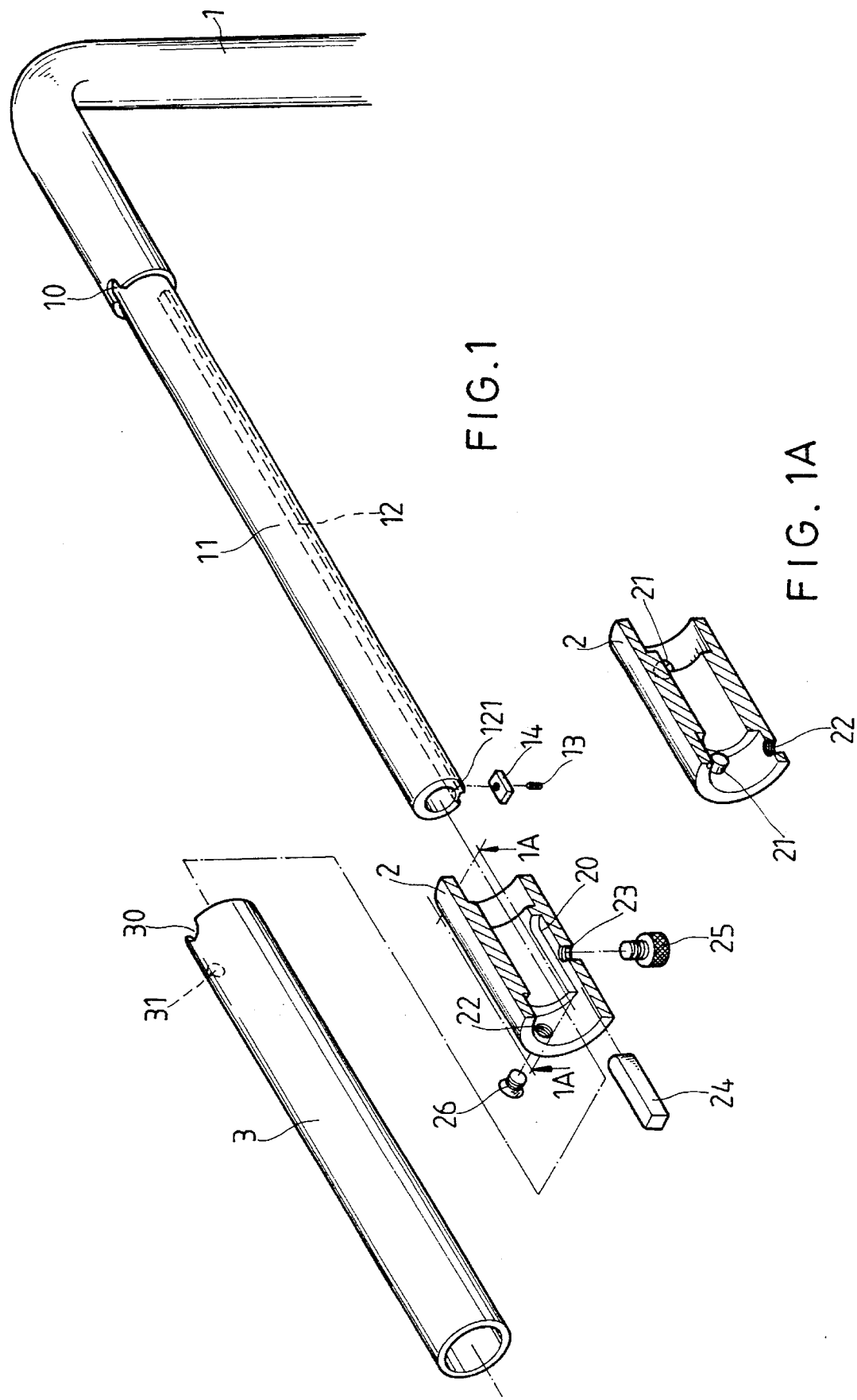
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
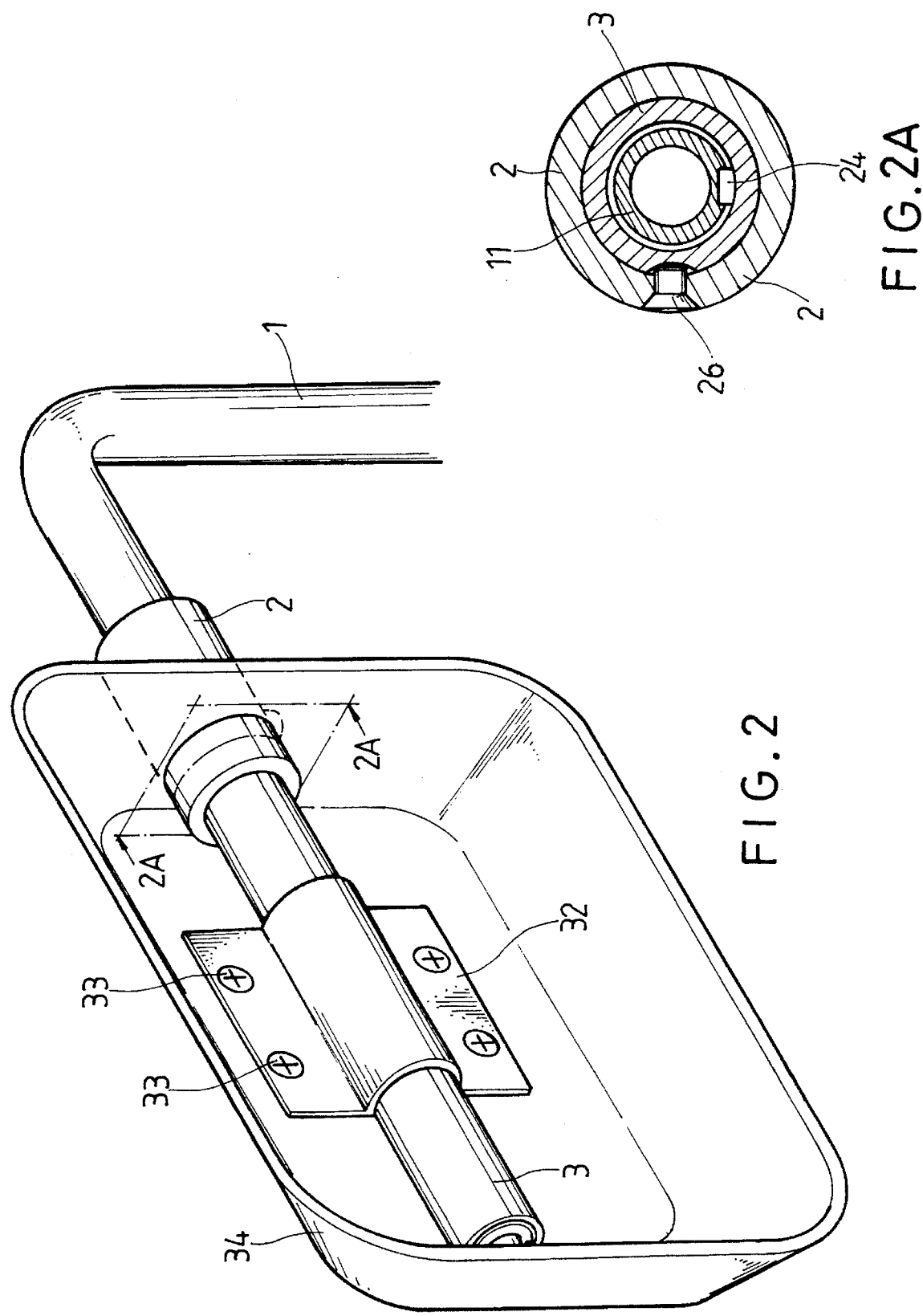
FIG. 2 is a perspective view of the present invention.
Figure 3:
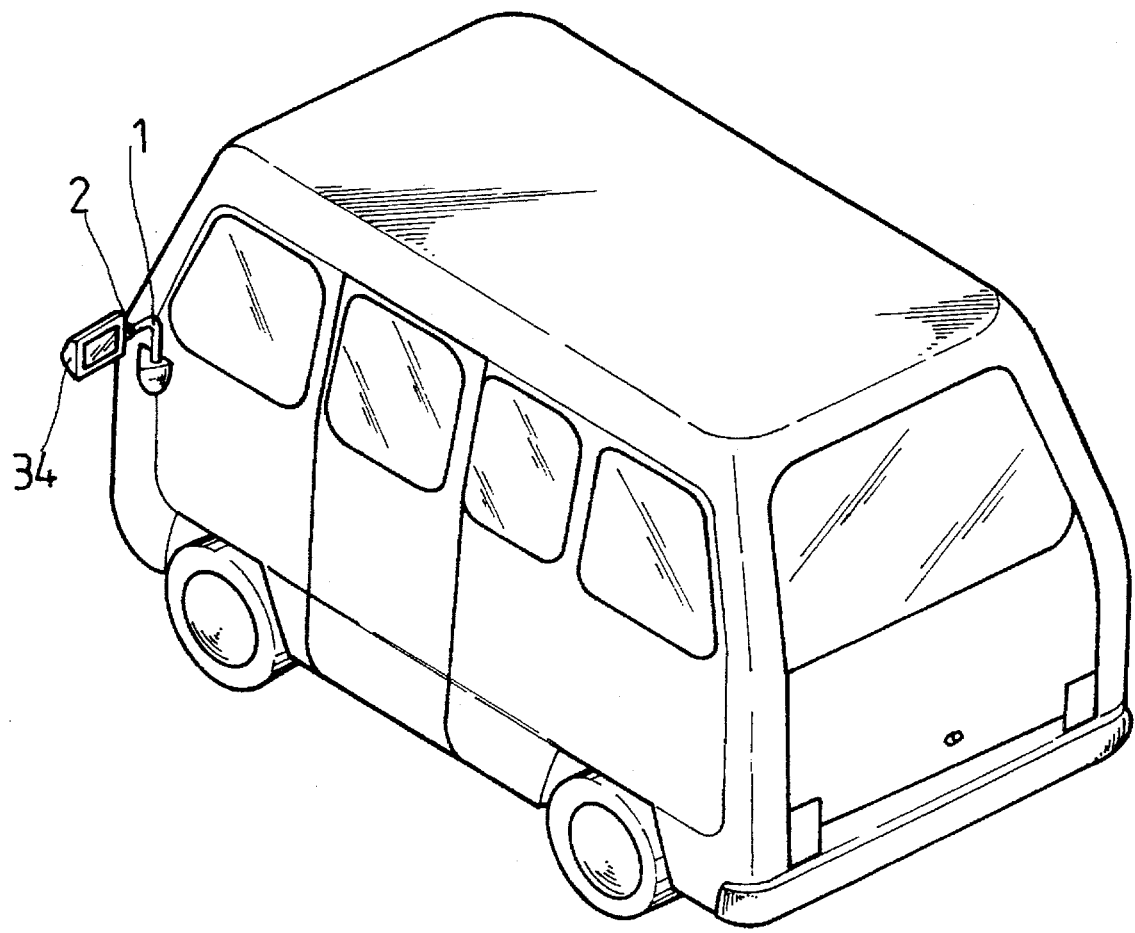
FIG. 3 is a working view of the present invention.
Figure 5:
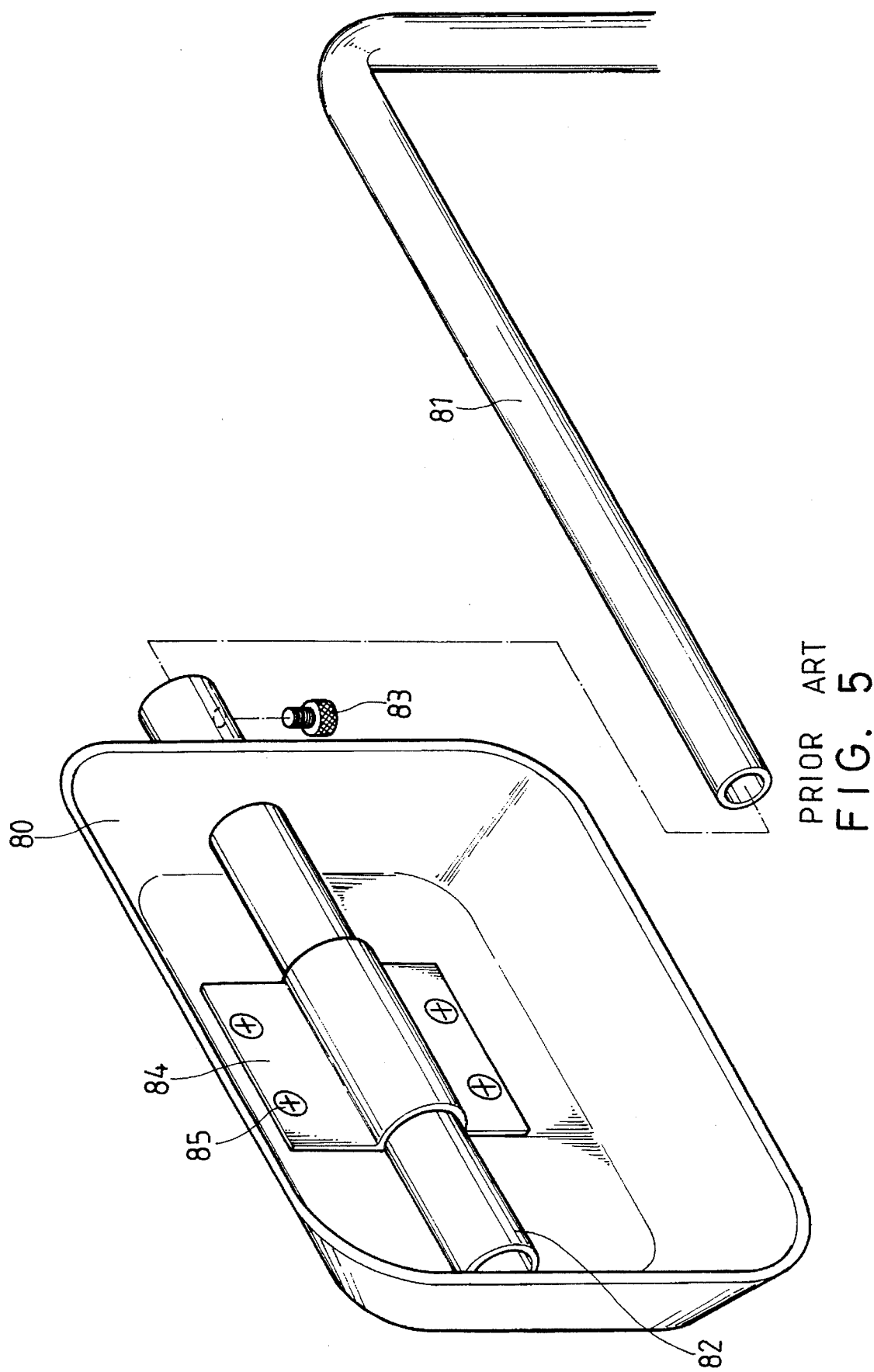
FIG. 5 is a perspective view of a prior art side view mirror.

With reference to the drawings and in particular to FIGS. 1, 1A and 2 thereof, the side view mirror for automobiles mainly comprises a housing 34, a fixing tubular member 1, a tubular connector 2, and an outer tubular member 3.

As illustrated, the fixing tubular member 1 is formed with a notch 10 at an end thereof. An inner tubular member 11 extends from the fixing tubular member 1 and is preferably integrally formed therewith. The inner tubular member 11 is formed at the bottom with a longitudinal groove 12 having a hole 12 close to the outer end thereof. A stopper 14 is fixedly mounted in the outer end of the longitudinal groove 12 of the inner tubular member 11 by a pin 13 extending through the stopper 14 into the hole 121 of the inner tubular member 11.

The inner side of the tubular connector 2 is formed with a slot 20 having a threaded hole 23 engaged with a bolt 25, a threaded hole 22 close to an end thereof, and two protuberances 21 one close to an end thereof. A positioning member 24 is fitted in the slot 20 of the tubular connector 2. The tubular connector 2 is put over the inner tubular member 11, with the positioning member 24 fitted between the slot 20 of the tubular connector 2 and the longitudinal groove 12 of the inner tubular member 11.

The outer tubular member 3 is formed with a notch 30 at an end thereof and a hole 31 close to the end. The outer tubular member 3 is inserted in the tubular connector 2, with the notch 30 engaged with a protuberance 21 of the outer tubular member 3 and the hole 31 aligned with the threaded hole 22 of the tubular connector 2. The outer tubular member 3 is engaged with the tubular connector 2 by a bolt 26 extending through the hole 31 of the outer tubular member 3 to engage with the threaded hole 22 of the tubular connector 2.

The tubular connector 2 is partially fitted in the housing 34 and the outer tubular member 3 is fixedly installed on the inner side of the housing 34 by a mount 32 in association with a plurality of screws 33. A mirror (not shown) is mounted in the housing 34.

When desired to adjust the position of the mirror, it is only necessary to loosen the bolt 25 and then move the mirror together with the outer tubular member 3 and the tubular connector 2. The stopper 14 is used to prevent the tubular connector 2 from getting out of the inner tubular member 11.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A telescopic side view mirror comprising:

a housing;

a fixing tubular member formed with an inner tubular member having a longitudinal groove at a bottom;

a stopper being fixedly mounted in the longitudinal groove of said inner tubular member;

an outer tubular member extending into said housing and fixedly mounted therein, said outer tubular member being formed with a hole close to an end thereof;

a tubular connector fitted in said housing and formed with a slot having a first threaded hole engaged with a first bolt, a second threaded hole aligned with the hole of said outer tubular member, and two protuberances one close to an end thereof, said tubular connector being engaged at an end with said outer tubular member and at another end with said inner tubular member; and a positioning member fitted between the slot of said tubular connector and the longitudinal groove of said inner tubular member.

2. The telescopic side view mirror as claimed in claim 1, wherein said tubular connector is formed with a slot having a threaded hole engaged with a second bolt.

3. The telescopic side view mirror as claimed in claim 1, wherein said tubular connector is provided with two protuberances one close to an end thereof.

4. The telescopic side view mirror as claimed in claim 1, wherein said fixing tubular member is formed with a notch adapted to receive a corresponding one of the protuberances of said tubular connector.

5. The telescopic side view mirror as claimed in claim 1, wherein said outer tubular member is formed at an end thereof with a notch adapted to receive a corresponding one of the protuberances of said tubular connector.

* * * * *